United States Patent
Amdahl

(10) Patent No.: US 10,432,406 B1
(45) Date of Patent: Oct. 1, 2019

(54) CIPHER RULE FEEDBACK

(71) Applicant: F5 Networks, Inc., Seattle, WA (US)

(72) Inventor: Saxon Carl Amdahl, Portola Valley, CA (US)

(73) Assignee: F5 Networks, Inc., Seattle, WA (US)

( * ) Notice: Subject to any disclaimer, the term of this patent is extended or adjusted under 35 U.S.C. 154(b) by 208 days.

(21) Appl. No.: 15/389,283

(22) Filed: Dec. 22, 2016

Related U.S. Application Data

(60) Provisional application No. 62/271,122, filed on Dec. 22, 2015.

(51) Int. Cl.
| | |
|---|---|
| *H04L 9/32* | (2006.01) |
| *H04L 9/06* | (2006.01) |
| *H04L 29/06* | (2006.01) |
| *H04W 12/06* | (2009.01) |
| *H04L 12/24* | (2006.01) |

(52) U.S. Cl.
CPC .......... *H04L 9/3249* (2013.01); *H04L 9/0618* (2013.01); *H04L 41/12* (2013.01); *H04L 63/0876* (2013.01); *H04L 63/166* (2013.01); *H04W 12/06* (2013.01)

(58) Field of Classification Search
CPC ....................................................... H04L 41/12
See application file for complete search history.

(56) References Cited

U.S. PATENT DOCUMENTS

| | | | | | |
|---|---|---|---|---|---|
| 4,348,739 | A | * | 9/1982 | Deaver ................. | G06F 13/387 710/8 |
| 2006/0155721 | A1 | * | 7/2006 | Grunwald ............. | H04L 63/083 |
| 2006/0190612 | A1 | * | 8/2006 | Kahol .................... | H04L 69/16 709/230 |
| 2011/0185073 | A1 | * | 7/2011 | Jagadeeswaran ....... | H04L 69/16 709/228 |
| 2016/0080502 | A1 | * | 3/2016 | Yadav ................... | H04L 63/061 709/227 |

OTHER PUBLICATIONS

Bit Fields in C by GeeksForGeeks. Published Mar. 1, 2015 (Year: 2015).*
F5 Networks, Inc., "Configuration Guide for BIG-IP Local Traffic Management," Version 10.0.0, https://support.f5.com/content/kb/en-us/products/big-ip_ltm/manuals/product/ltm_configuration_guide_10_0_0/_jcr_content/pdfAttach/download/file.res/Configuration_Guide_for_BIG-IP_Local_Traffic_Management.pdf, Published May 29, 2009, 575 pages.

* cited by examiner

*Primary Examiner* — Madhuri R Herzog
(74) *Attorney, Agent, or Firm* — John W. Branch; Lowe Graham Jones PLLC

(57) ABSTRACT

Embodiments are directed towards managing network communication. A TMC may be arranged to receive network traffic that includes cipher negotiation information from a client computer. The TMC may receive other network traffic from a server computer that may include server cipher negotiation information. The TMC provides negotiation data that may correspond to the client cipher negotiation information and other negotiation data that may correspond to the server cipher negotiation information. The TMC may store the negotiation data and the other negotiation data in a data store. Then TMC may send the server cipher negotiation information at least the client computer. If a query is received from a query client, the TMC may provide result set information based on the stored the negotiation data and the other negotiation data in the data store. The TMC may send the reporting information based on the result set information to the query client.

27 Claims, 11 Drawing Sheets

CIPHER RULE FEEDBACK

CROSS-REFERENCE TO RELATED APPLICATIONS

This application is a Utility Patent application based on a previously filed U.S. Provisional Patent Application U.S. Ser. No. 62/271,122 filed on Dec. 22, 2015, the benefit of the filing date of which is hereby claimed under 35 U.S.C. § 119(e) and which is further incorporated by reference in its entirety.

TECHNICAL FIELD

The present invention relates generally to network traffic management and, more particularly, but not exclusively to methods for the application of ciphers to secure communication.

BACKGROUND

The proliferation of sensitive and/or personal information exchanged over computer networks, such as, the internet has driven an increase in the use for cryptography protocols to secure and authenticate the contents of the communications. There are many different types of devices and applications that may be required to communicate using secure protocols. However, support for secure communication may vary among the many different types of devices and/or applications that may carry sensitive information. For example, different clients may support and/or require particular ciphers and/or cipher suites. Likewise, different servers may support and/or require particular ciphers and/or cipher suites. Accordingly, devices and/or applications that engage in secure communication are often arranged to conduct a negotiation process to select a mutually sufficient/available secure communication method. Thus, it is with respect to these considerations and others that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

Figure 1:
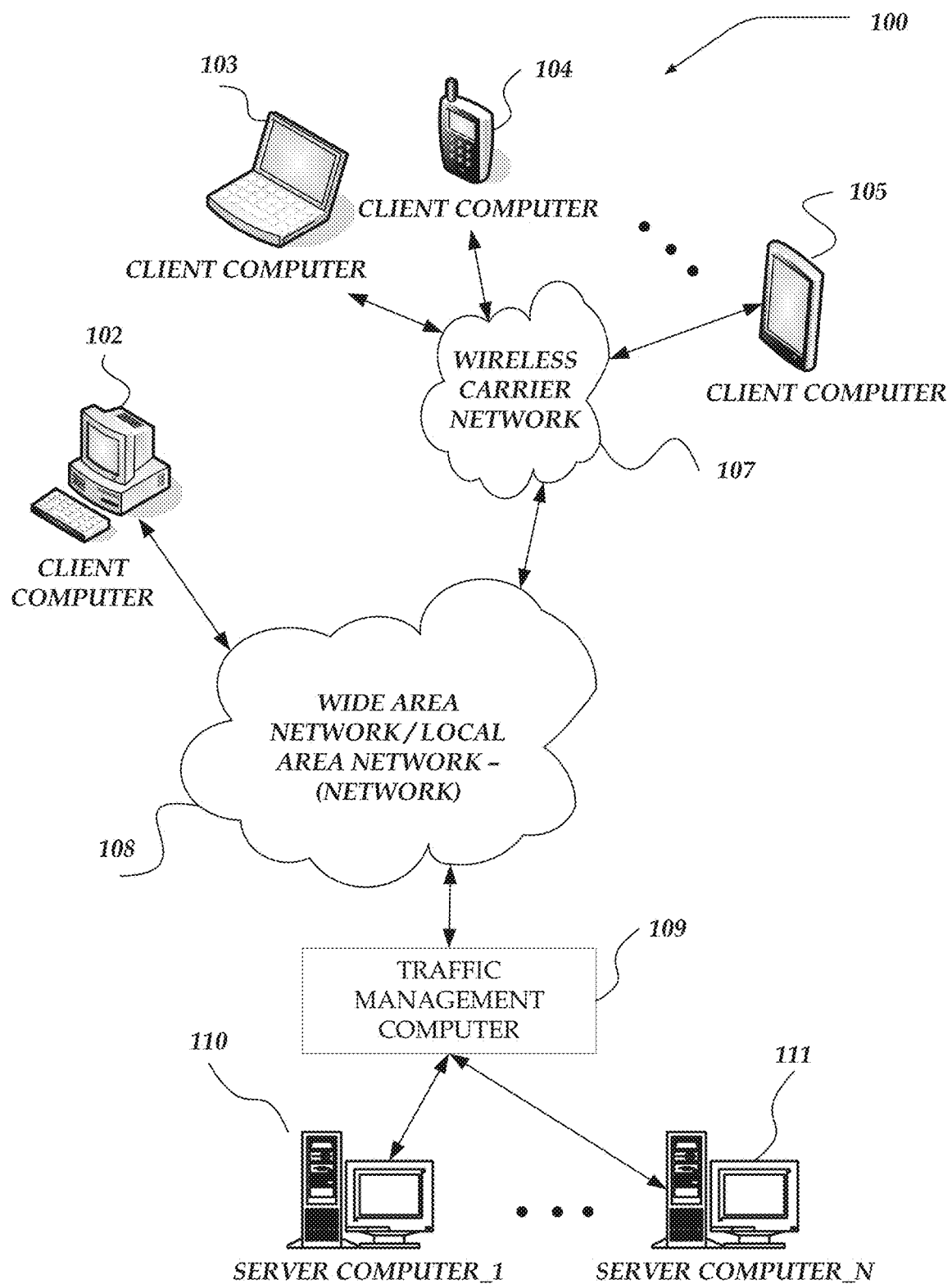
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to key that may be generated based on a tuple comprising any combination of fields selected from within a network packet header, including those fields identified above.

As used herein, the terms "network flow," "connection flow,", "flow" may refer to a network session established between two endpoints. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may be impaired if network packets may be routed using varying paths and/or directed different endpoints. Further, one or more protocol options may be associated with a flow enabling the endpoints to employ one or more features of the protocol that may be otherwise optional.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

As used herein the term "network traffic" refers to data and/or information that is communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the term "policy rule" refers to conditions and actions that may be paired together such that if a condition is met then the corresponding action may be executed. In at least one of the various embodiments, conditions may be compound conditions comprised of multiple conditions. In at least one of the various embodiments, actions may also be compound actions, or in other words, multiple actions may be associated with a condition and/or a policy rule. Policy rules may be arranged perform various network traffic management actions on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management device.

As used herein "cipher suite," "ciphers" refers encryption/cryptography algorithms that may be supported by a client or server. In some cases, a cipher suite is a particular combination of authentication algorithms, bulk encryption algorithms, message authentication algorithms, and cryptographic key exchange algorithms. In some cases, cipher suites may be associated with a well-defined name string that may be used to identify the cipher suite and it various constituents. For example, the Internet Assigned Numbers Authority (IANA) maintains a registry of TLS cipher suites and their corresponding name strings.

As used herein "cipher negotiation" refers to a process where a client and server communication which each to determine the cipher suite they may use for secure communication. The actual messages and message passing for cipher negotiation is defined as part of a communication protocol being used by the client and server. In some cases, the client will provide a list of ciphers/cipher suite that it has available and the server will respond with a cipher/cipher suite selected from the clients list (if an acceptable cipher/cipher suite is available).

As used herein "cipher negotiation information" refers to the information exchanged between clients and servers during cipher negotiation. In some example, this may include a list of ciphers/cipher suites available to a client and a servers a cipher/cipher suite selected from the clients list (if an acceptable cipher/cipher suite is available).

As used herein "negotiation data" refers data that may be arranged to capture and/or record the cipher negotiation information exchanged between client and servers during cipher negotiation. In some embodiments, the negotiation data may be arranged as bitfields. In other embodiments, other data structures may be used.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards for managing network communication that may executable by one or more traffic management computers (TMCs) with at least one processor.

In at least one of the various embodiments, the TMC may be arranged to use a first processor on the TMC to receive network traffic that includes at least client cipher negotiation information from a client computer.

In at least one of the various embodiments, the TMC may be arranged to use a second processor on the TMC to receive other network traffic from a server computer that may include at least server cipher negotiation information.

In at least one of the various embodiments, the TMC may be arranged to use a third processor on the TMC to perform operations to provide negotiation data that may correspond to the client cipher negotiation information and other negotiation data that corresponds to the server cipher.

In at least one of the various embodiments, the TMC may be arranged to use the third processor on the TMC to perform operations for storing the negotiation data and the other negotiation data in a data store of the one or more traffic management computers.

In at least one of the various embodiments, the TMC may be arranged to use a fourth processor on the TMC to send the server cipher negotiation information at least the client computer. In at least one of the various embodiments, if a query is received from a query client, the TMC may be arranged use one or more of the first processor, the second processor, the third processor, or the fourth processor to provide result set information based on the stored the negotiation data and the other negotiation data in the data store of the traffic management computers.

In at least one of the various embodiments, the TMC may be arranged use one or more of the first processor, the second processor, the third processor, or the fourth processor to send reporting information that may be based on the result set information to the query client.

In at least one of the various embodiments, if a query may be received from a query client, result set information based on the stored the negotiation data and the other negotiation data in a data store of the one or more traffic management computers may be provided. And, in at least one of the various embodiments, reporting information that may be based on the result set information may be sent to the query client.

In at least one of the various embodiments, the negotiation data and the other negotiation data may be arranged as separate bitfields such that each bit in the separate bitfields may correspond to a portion of the client cipher negotiation information and the server cipher negotiation information.

In at least one of the various embodiments, the reporting information may include information about the clients that have attempted to negotiate a secure session with a server. The reporting information may include a report of the clients that performed the negotiation attempts and, in some embodiments, the information may be arranged based on various characteristics that may be associated with the clients, including, operating system, user-agent, application, or the like.

In at least one of the various embodiments, the reporting information may include information about the clients that have successfully negotiated a secure session with a server. The reporting information may include a report of the clients that performed the successful negotiations.

Also, in some embodiments, the information may be arranged based various characteristics that may be associated with the clients, including, operating system, user-agent, application, or the like.

In at least one of the various embodiments, one or more candidate cipher rule modifications may be received. Accordingly, in at least one of the various embodiments, a distribution of changes in cipher negotiation outcomes based on the one or more candidate cipher rule modifications and the stored negotiation data and the stored other negotiation data may be included in the reporting information.

In at least one of the various embodiments, one or more candidate cipher rule modifications may be received. Accordingly, in at least one of the various embodiments, information regarding the potential performance impact of the modifications may be included in the reporting information. The information may be based on the stored negotiation data and the stored other negotiation data such that the stored other negotiation data includes computing load information that may be associated with the one or more candidate cipher rule modifications.

In at least one of the various embodiments, one or more candidate cipher rule modifications may be received. Accordingly, in at least one of the various embodiments, a list of clients and servers that would be prevented from negotiating secure connections based on the one or more candidate cipher rule modifications and the stored negotiation data and the stored other negotiation data may be included in the reporting information.

In at least one of the various embodiments, report information that includes a distribution of cipher rule classes used in successful negotiation outcomes based on the one or more candidate cipher rule modifications and the stored negotiation data and the stored other negotiation data may be included in the reporting information.

In at least one of the various embodiments, one or more candidate cipher rule modifications may be received. Accordingly, in at least one of the various embodiments, the distribution of changes in cipher rule classes based on the one or more candidate cipher rule modifications and the stored negotiation data and the stored other negotiation data may be included in the reporting information.

In at least one of the various embodiments, the TMC may be arranged such that the first processor, the second processor, third processor, or the fourth processor may be the same processor. Also, in at least one of the various embodiments, the TMC may be arranged such that at least one of the first processor, the second processor, the third processor, or the fourth processor may be on the same traffic management computer.

Illustrated Operating Environment

FIG. 1 shows components of one embodiment of an environment in which the invention may be practiced. Not all of the components shown may be required to practice the invention, and variations in the arrangement and type of the components may be made without departing from the spirit or scope of the invention.

As shown, system 100 of FIG. 1 includes local area networks ("LANs")/wide area networks ("WANs")-(network) 108, wireless network 107, client computers 102-105, traffic management computer ("TMC") 109, server computers 110-111. Network 108 is in communication with and enables network traffic for communication between client computers 102-105, wireless network 107, and TMC 109. Wireless carrier network 107 further enables communication with wireless devices, such as client computers 103-105. TMC 109 is in communication with network 108, and server computers 110-111.

One embodiment of client computers 102-105 is described in more detail below in conjunction with FIG. 2. In one embodiment, at least some of client computers 102-105 may operate over a wired and/or a wireless network, such as networks 107 and/or 108. Generally, client computers 102-105 may include virtually any computer capable of communicating over a network to send and receive information, including instant messages, performing various online activities, or the like. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computer capable of connecting to another computer and receiving information, such as laptop computer 103, smart phone 104, tablet computer 105, or the like. However, portable computers are not so limited and may also include other portable computers, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application may also be used to perform various online activities.

Client computers 102-105 also may include at least one other client application that is configured to receive and/or send data between another computer. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, Mobile Identification Number ("MIN"), an electronic serial number ("ESN"), or other mobile computer identifier. The information may also indicate a content format that the mobile computer is enabled to employ. Such information may be provided in a network packet, or the like, sent between other client computers, TMC 109, server computers 110-111, or other computers.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless carrier network 107 is configured to couple client computers 103-105 and its components with network 108. Wireless carrier network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless carrier network 107 may further include an autonomous system of terminals, gateways, routers, and the like connected by wireless radio links, and the like. These connectors may be configured to move freely and randomly and organize themselves arbitrarily, such that the topology of wireless carrier network 107 may change rapidly.

Wireless carrier network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless carrier network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless carrier network 107 may include virtually any wireless communication mechanism by which information and/or network traffic may travel between client computers 103-105 and another computer, network, and the like.

Network 108 is configured to couple network computers with other computers, including, server computers 110-111, TMC 109, client computer 102, and client computers 103-105 through wireless network 107. Network 108 is enabled to employ any form of computer readable media for communicating information in the form network traffic from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Network traffic communicated over a network may include various signals associated with the low level operation of the network, routing, as well as higher level communication for applications. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information or network traffic may travel between computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TMC 109 is described in more detail below in conjunction with FIG. 3. Briefly, however, TMC 109 may include virtually any network computer capable of provide traffic management services and managing network traffic between client computers 102-105 and server computers 110-111. Such computers include, for example, routers, proxies, firewalls, load balancers, cache devices, computers that perform network address translation (NAT), application delivery controllers, or the like, or any combination thereof. TMC 109 may perform the operations of routing, translating, switching packets, or the like. In one embodiment, TMC 109 may inspect incoming network packets, and may perform an address translation, port translation, a packet sequence translation, and the like, and route the network packets based, at least in part, on the packet inspection. In some embodiments, a TMC may be referred to as a traffic management device (TMD).

Server computers 110-111 may include virtually any network computer that may operate as a website server. However, server computers 110-111 are not limited to website servers, and may also operate as messaging server, a File Transfer Protocol (FTP) server, a database server, content server, email servers, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates TMC 109 and server computers 110-111 as single computers, the invention is not so limited. For example, one or more functions of each of TMC 109 or server computers 110-111 may be distributed across one or more distinct network computers. Moreover, TMC 109 or server computers 110-111 are not limited to a particular configuration such as the one shown in FIG. 1. Thus, in one embodiment, TMC 109 or server computers 110-111 may be implemented using a plurality of network computers. In other embodiments, server computers may be implemented using a plurality of network computers in a cluster architecture, a peer-to-peer architecture, or the like. Further, in at least one of the various embodiments, TMC 109 or server computers 110-111 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
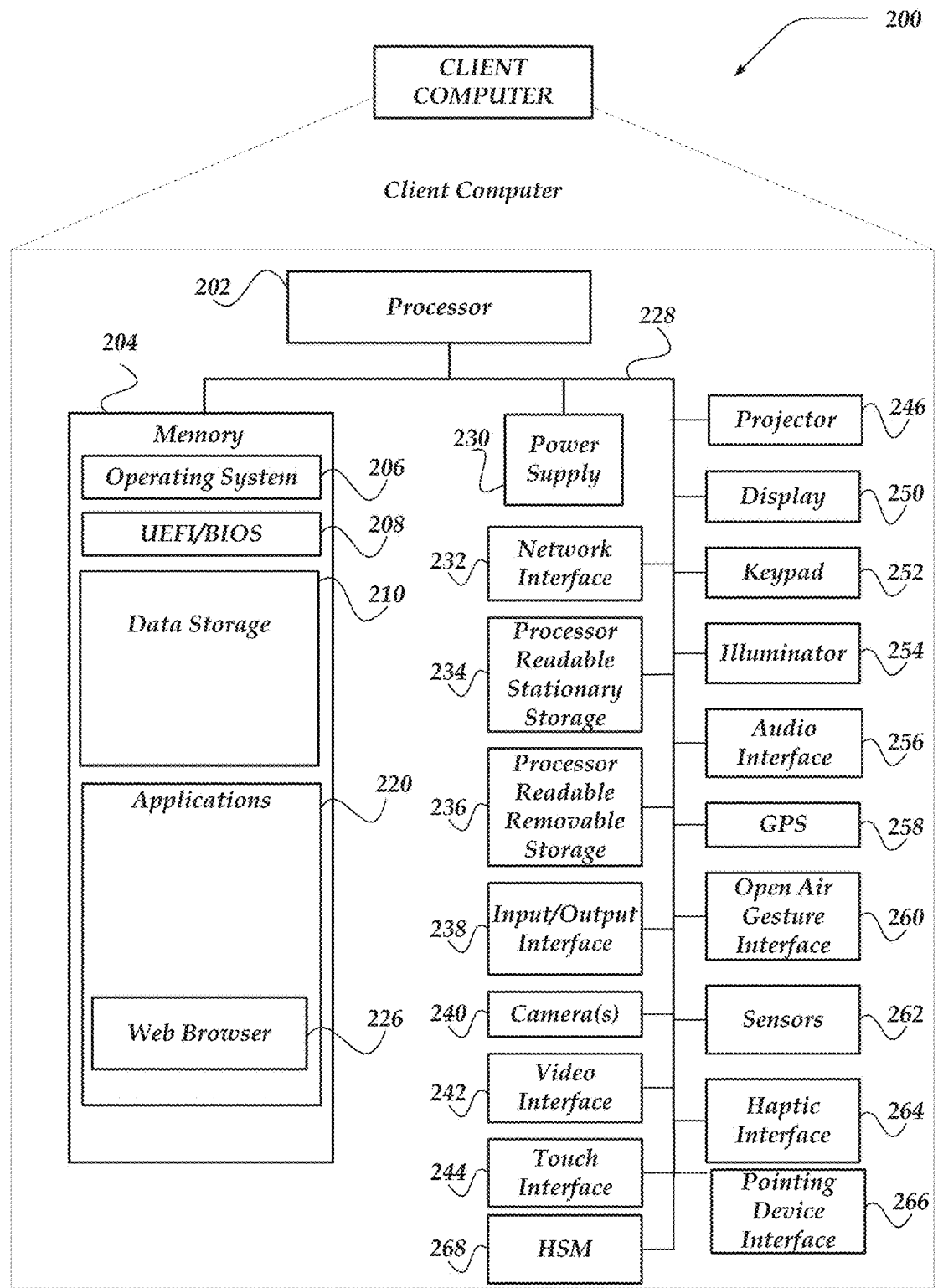
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as, processor 202 in communication with memory 204 via bus 228. In some embodiments, the one or more processors may each include one or more processing cores. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, sensors interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer. In some embodiments, HSM 268 may be arranged to provide hardware acceleration for one or more cryptographic operations and/or ciphers.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keypad 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store UEFI/BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer com-munication operating system such as Windows Phone™, Android Operating System, or Apple's IOS operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. Applications 220 may include computer executable instructions which, when executed by client computer 200, transmit, receive, and/or otherwise process instructions and data, such as, establishing secure communication sessions with TMC 109 and/or other servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In at least one of the various embodiments, applications, such as, web browser 226, other applications, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 258. Also, in some embodiments, geolocation information may include information providing using one or more geo-location protocols over the networks, such as, wireless network 108 and/or network 111.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
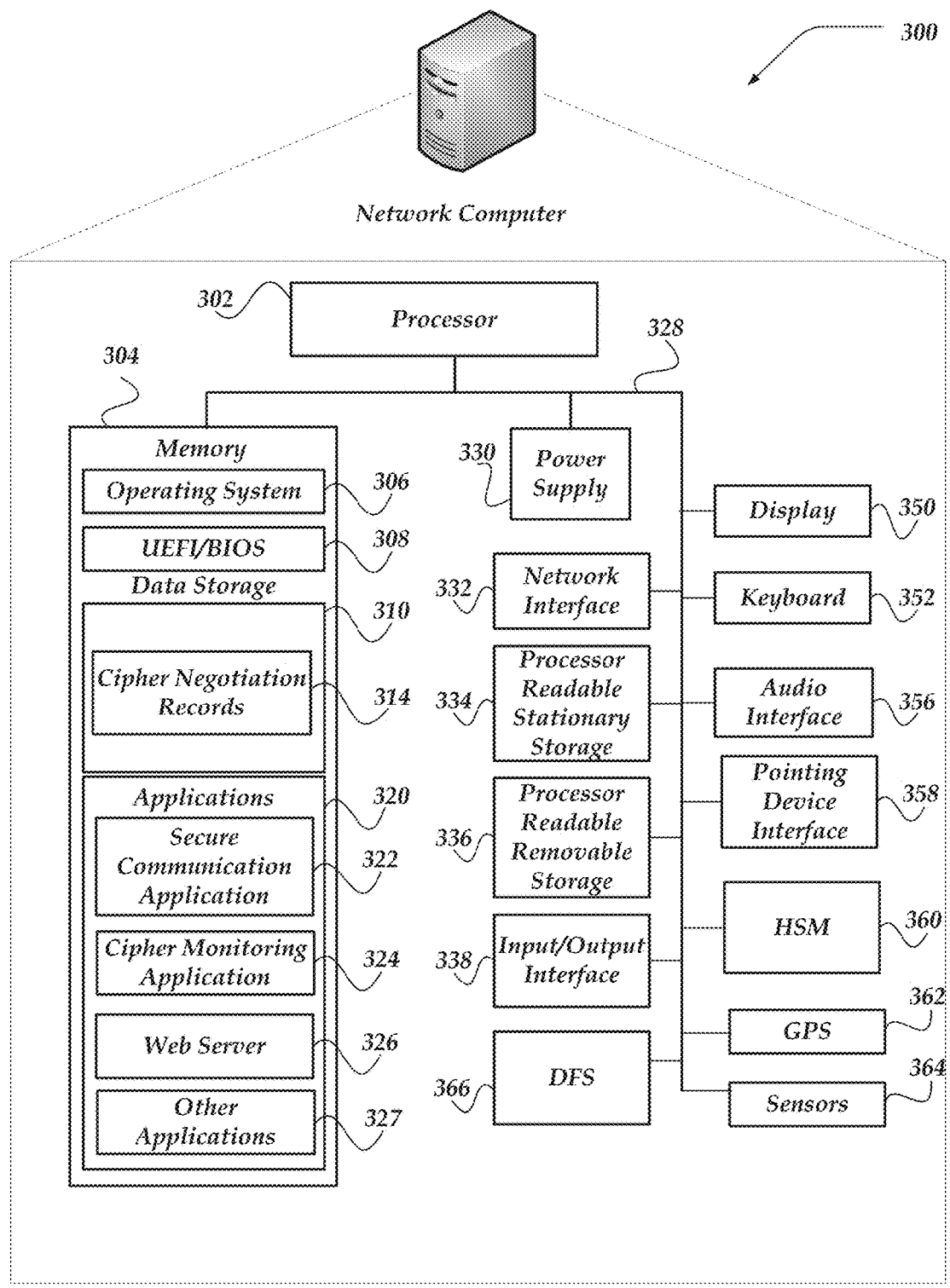
FIG. 3 shows an embodiment of a network computer that may be included in a system such as that shown in FIG. 1.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of traffic management computer (TMC) 109 of FIG. 1.

As shown in the figure, network computer 300 includes one or more processors, such as, processor 302 in communication with a memory 304 via a bus 328. In some embodiments, one or more of the one or more processors may include one or more processing cores. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components may be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), non-transitory, and/or other types of memory. Memory 304 illustrates an example of computer-readable storage media (devices) for storage of information such as computer-readable instructions, data structures, program modules or other data. Memory 304 stores a unified extensible firmware interface and/or basic input/output system and/or (UEFI/BIOS) 308 for controlling low-level operations of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, cipher negotiation records 314, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include secure communication application 322, cipher monitoring application 324, web server application 326, other applications 327, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, secure communication application 322, cipher monitoring application 324, web server application 326, other applications 327, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocols over the networks, such as, wireless network 108 and/or network 111.

Furthermore, in at least one of the various embodiments, secure communication application 322 may be operative in a cloud-based computing environment. In at least one of the various embodiments, these applications, and others, that comprise the management platform may be executing within virtual machines and/or virtual servers that may be managed in a cloud-based based computing environment. Also, in at least one of the various embodiments, secure communication application 322, or the like, may located in virtual servers running in a cloud-based computing environment rather than being tied to one or more specific physical network computer.

Also, in at least one of the various embodiments, secure communication application 322 may be running in one or more virtual machines (VM's) executing on network computer 300. In at least one of the various embodiments, virtual machines running on network computer 300 may be managed and/or supervised by a hypervisor.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Network computer 300 may also include DFS 366 for maintaining connection flows between client computers, such as client computers 102-105 of FIG. 1, and server computers, such as server computers 110-111 of FIG. 1. In one embodiment, DFS 366 may include hardware-optimized operations for packet traffic management, such as repetitive operations associated with packet traffic management. For example, DFS 366 may perform statistics gathering, per-packet policy enforcement (e.g., packet address translations), or the like, on connection flows maintained at DFS 366. In some embodiments, DFS 366 may route, switch, forward, and/or otherwise direct packets based on policy rules for a particular connection flow signature (e.g., a 5 tuple of a received packet). Thus, DFS 366 may include capabilities and perform tasks such as that of a router, a switch, a routing switch, firewalls, network address translation, or the like. In at least one of the various embodiments, components of DFS 366 may comprise and/or work in combination to provide high-speed flow caches for optimizing packet traffic management.

Additionally, in one or more embodiments (not shown in the figures), network computer 300 may include an embedded logic hardware device instead of a CPU (e.g., hardware processor), such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
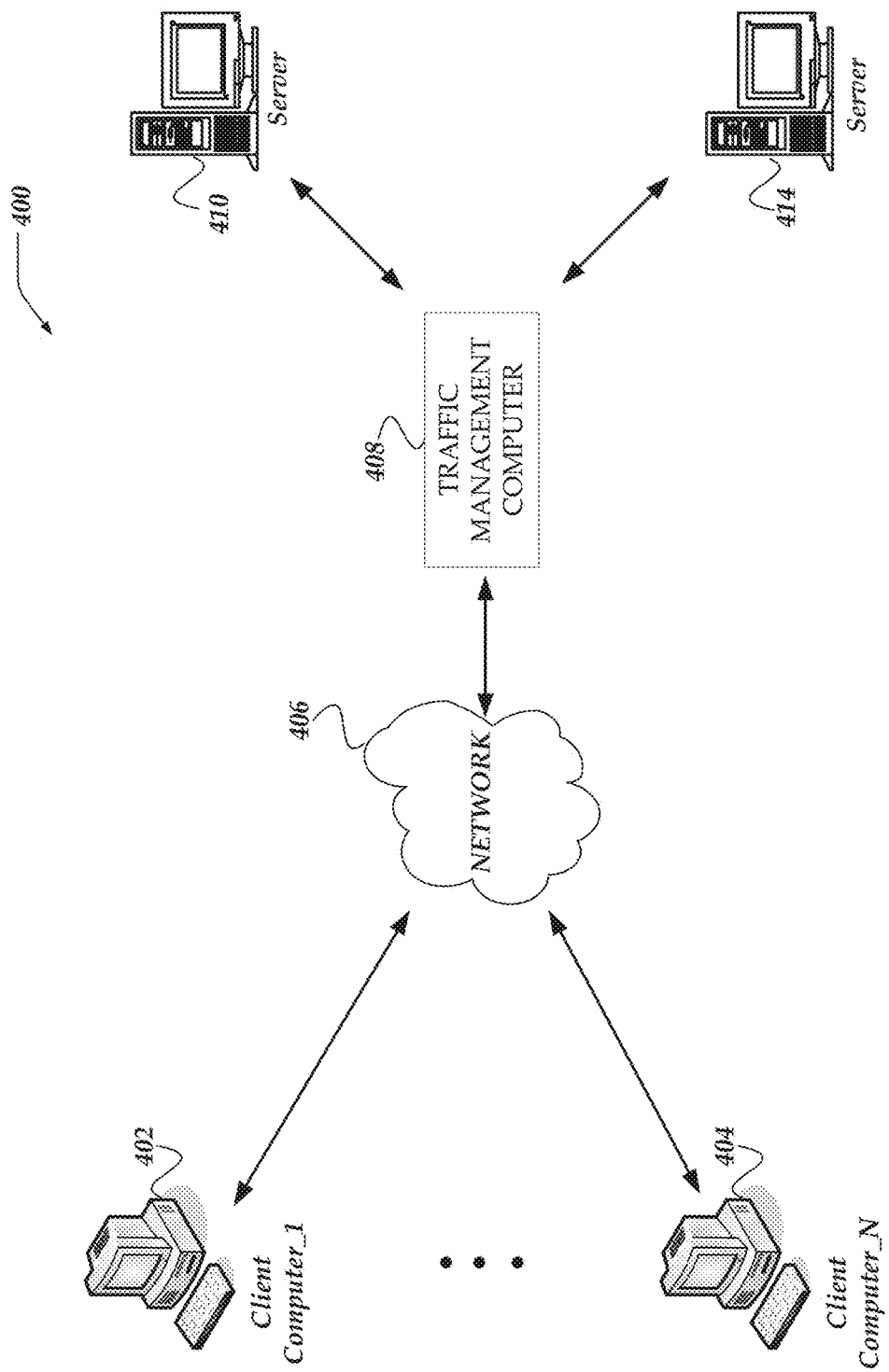
FIG. 4 illustrates a portion of a system for cipher rule feedback in accordance with at least one of the embodiments.

FIG. 4 illustrates a portion of system 400 for cipher rule feedback in accordance with at least one of the embodiments. In at least one of the various embodiments, one or more client computers, such as, client computer 402, client computer 404, or the like, may be performing communication over a network through network 406. In at least one of the various embodiments, Network 406 may be, a network, such as, wireless network 107, network 108, or the like. Network 406 may be in communication with TMC 408. In at least one of the various embodiments, TMC 408 may be in communication with one or more server computers, such as, server computer 410, and server computer 414.

In at least one of the various embodiments, client computers 402-404 may be arranged to attempt to establish secure communication sessions over network 406 to TMC 408, server 410, server 414, or the like. Accordingly, in at least one of the various embodiments, TMC 408 may be arranged to monitor and/or facilitate the establishment of secure communication sessions between the client computers and the server computers.

Note, client computers may include any type of computer that needs to establish a secure communication session, such as, client computers, network computers, mobile computers, virtual machines (including cloud-based computers), or the like. Likewise, in production environments there may be more or fewer TMCs, server computers and/or client computers than depicted here in FIG. 4.

In at least one of the various embodiments, since TMC 408 is disposed between the client computers and the server computers, it may be arranged to monitor the network traffic between them. In at least one of the various embodiments, if a secure communication session is being established between one or more of client computers 402-404 to one or more of server computers 410-412, TMC 408 may monitor the messages that may be exchanged to establish the secure communication session. In some embodiments, these initial messages may follow a handshake protocol. For example, to establish a Transport Layer Security (TLS) session, clients and servers may exchange one or more handshake messages that conform to the well-known TLS protocol.

In at least one of the various embodiments, in one or more of the handshake messages, a client may provide cipher information that includes information regarding the cryptography features supported and/or required by the client application for establishing secure communication sessions. In some embodiments, this information may be included in a cipher negotiation string that uses one or more known formats for describing the cipher suites and/or ciphers supported or required by the client.

In at least one of the various embodiments, server applications (or the TMC itself) may examine the provided cipher negotiation string and select a secure communication method that may be compatible/supported by the client based on the contents of the provided cipher negotiation string. In some embodiments, in some cases, the server may not support any ciphers compatible with the client, or in some cases, the servers may decline to support ciphers in the client's cipher negotiation string. For example, a client may be requesting to use a compromised, or otherwise unsafe cipher. Accordingly, in this example, the server may decline to establish a secure communication session since the client does not support cryptography protocols deemed by the server to be secure.

In at least one of the various embodiments, clients and servers may be configured to determine the types of cryptography features required for establishing secure communication sessions. Also, in at least one of the various embodiments, a TMC, such as, TMC 408 may be configured to enforce (e.g., require some ciphers, or exclude others, and so on) cryptography features used for secure communication by the servers that it may be managing. In at least one of the various embodiments, cipher rules may be established to define the ciphers and/or other cryptographic requirements for establishing secure communications. These cipher rules may be used by the TMC and/or servers to control one or more cryptographic features required for stabling secure communication sessions. In at least one of the various embodiments, a cipher string may be an ordered list of ciphers used to negotiate the cipher which will secure the connection.

In at least one of the various embodiments, TMC 408 may be arranged to track the cipher negotiations used for establishing secure communication session. In at least one of the various embodiments, TMCs, such as, TMC 408 may be arranged to record the cipher negotiations, including the requested cipher list information provided by the client and the cipher that is selected (if any) by the server. Accordingly, the cipher list TMC may establish a database of the In at least one of the various embodiments, TMC 408 may be arranged to improve visibility into cipher negotiation and to associate negotiation outcomes with cipher selection policies. In at least one of the various embodiments, this may be achieved by creating negotiation data, such as, a bitfield, which may be arranged to encode the ciphers a client may be willing to negotiate as well as the selected cipher (if any) used in a successful negotiation. In at least one of the various embodiments, negotiation data, such as, the bitfield may then be used as a key for tracking the frequency of negotiation outcomes. In at least one of the various embodiments, this tracking may be performed in a database, in-memory hash table, or the like.

In at least one of the various embodiments, cipher negotiation information may then be used to visualize the distribution of negotiated ciphers using (e.g., pie charts, time-series graphs, or the like). In at least one of the various embodiments, if cipher policies are being generated or modified, the cipher negotiation information may be used to show which cipher rules may prevent cipher negotiation as well as which rules during configuration would result in blocked clients.

Also, in at least one of the various embodiments, data mining and/or statistical analysis of cipher negotiation information may enable various actions. In at least one of the various embodiments, the cipher negotiation information may be employed to display/analyze (e.g., report) the ciphers/cipher suites the client may be attempting to negotiate. The additional metrics collected and described in more detail below may enable the analysis to be broken into various dimensions, such as, as a whole, by application, by web browser (type/version), by operating system, or the like, or combination thereof.

Also, in some embodiments, the collected cipher negotiation information may be employed to display (or report) the ciphers/cipher suites that are accepted as a result a result of the negotiation process. The additional metrics collected and described above may enable the analysis to be broken into various dimensions, such as, as a whole, by application, by web browser (type/version), by operating system, or the like, or combination thereof.

In at least one of the various embodiments, historical cipher negotiation information may be employed to help evaluate how proposed cipher rule configurations or alteration of existing configurations may impact client/server behavior. For example, the collected cipher negotiation information may be employed as part of an analysis to determine the how many clients would be excluded by a proposed cipher requirement. Further, in some embodiments, other impacts of cipher configuration changes may also be examined, such as, performance impacts, changes in distribution of classes of ciphers/cipher suites, or the like. See also, FIG. 11.

In at least one of the various embodiments, if available, negotiation data, such as, bitfields may be augmented using cipher strings and/or other identifying features of the client (e.g., TCP fingerprints) to identify clients and associate them with the stored cipher negotiation information. In at least one of the various embodiments, augmenting the stored cipher negotiation information may enable reporting and/or visualization of the ciphers each type of client is negotiating as well as identifying client types which fail to negotiate ciphers with servers successfully.

Figure 5:
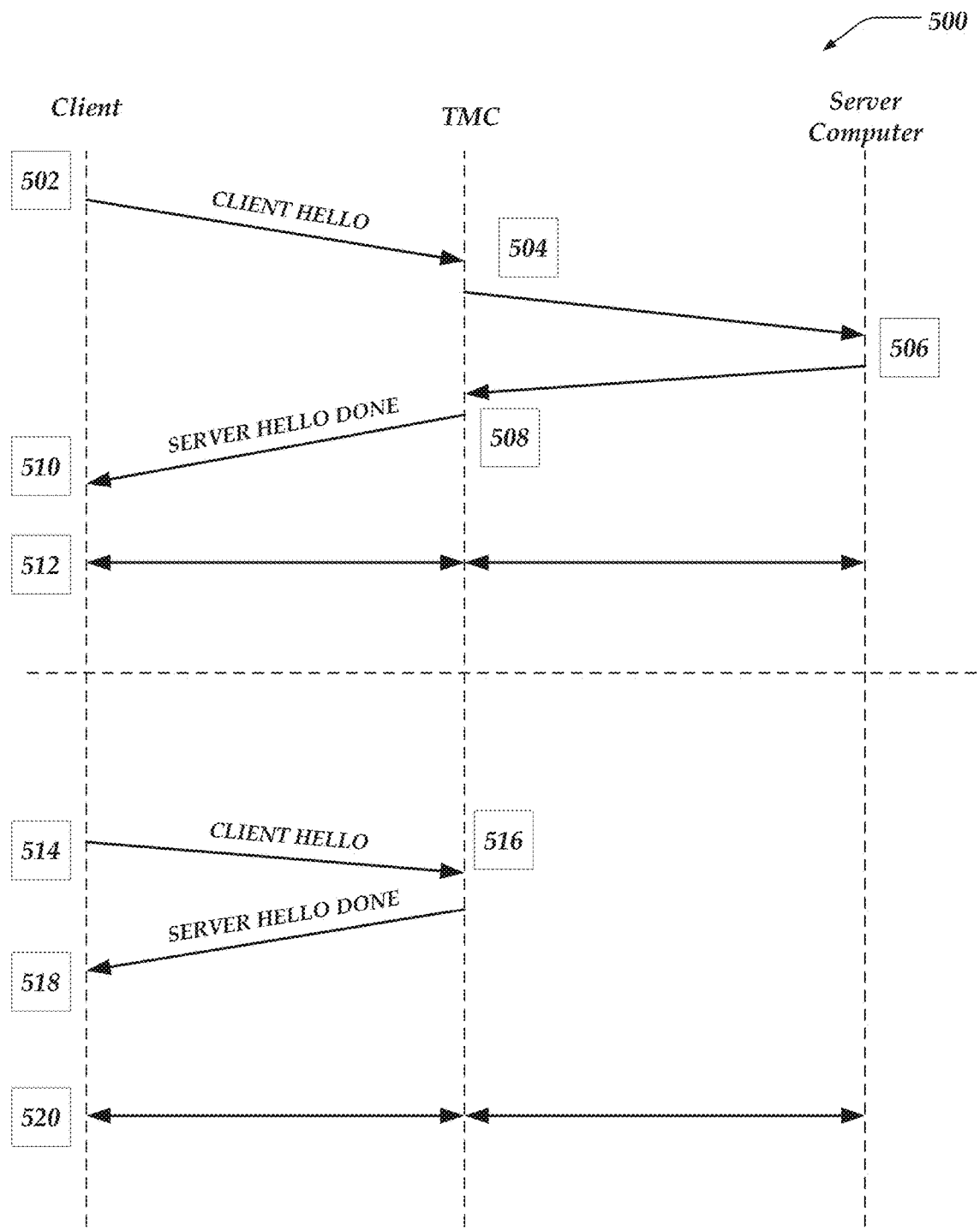
FIG. 5 illustrates a logical sequence diagram of a sequence for cipher negotiation in accordance with at least one of the various embodiments.

FIG. 5 illustrates a logical sequence diagram of sequence 500 for cipher negotiation in accordance with at least one of the various embodiments. In at least one of the various embodiments, clients and servers may use one or more communication protocols to establish a secure communication session. In at least one of the various embodiments, some protocols include a handshake protocol used for establish the session and negotiating mutually agreed upon ciphers for secure communication (if any). In this example, steps 502-512 illustrate the situation where the client conducts the negotiation with the server and the TMC monitors the handshake messages. And, steps 514-520 illustrate the situation where the TMC participates in the negotiation on behalf of the server.

At step 502, in at least one of the various embodiments, a client application on a computer (client computer or network computer) may begin the initiation of a secure communication session may be sending an initial message, such as, a TLS client HELLO message. In at least one of the various embodiments, among other things, this message may include cipher negotiation information, such as, a cipher string that describes the ciphers/cipher suites that the client agrees to use in this session.

At step 504, in at least one of the various embodiments, since the TMC is disposed between the client and server, it may be arranged to monitor the network traffic between the client and the server. Accordingly, in at least one of the various embodiments, the TMC may inspect the incoming HELLO message from the client and extract the cipher negotiation information (e.g., the TLS cipher string). In at least one of the various embodiments, the TMC may be arranged to map the cipher information provided by the client into negotiation data, such as, one or more bitfields, and store it in a data store. In at least one of the various embodiments, after obtaining the cipher negotiation information the client's HELLO message, it may be communicated to the server.

At step 506, in at least one of the various embodiments, the server may receive the client HELLO message, extract the cipher string and select a cipher/cipher suite based on the client's cipher string if any may be available. Accordingly, the server may generate the appropriate response message that includes the cipher/cipher suite selected by the server. The response may be communicated to the TMC.

At step 508, in at least one of the various embodiments, the TMC may obtain the servers response message. In at least one of the various embodiments, from this message the TMC may be arranged to extract the cipher/cipher suite that was selected by server (if any) and stored it with the negotiation information from step 504. Next, the TMC may communicate the server response message to the client.

At step 510, in at least one of the various embodiments, the client may obtain the server's response (e.g., for TLS a server HELLO DONE) and continue establishing the secure communication session. Note, if the cipher negotiation failed the secure session will not be established.

At step 512, in at least one of the various embodiments, the client and server may communicate using the secure session. In at least one of the various embodiments, after settling on a mutually agreeable cipher/cipher suite there may be additional well-known protocol steps (not shown) required by the current protocol to fully establish and/or maintain the secure communication session.

At step 514, in at least one of the various embodiments, a client application on a computer (client computer or network computer) may begin the initiation of a secure communication session may be sending an initial message, such as, a TLS client HELLO message. In at least one of the various embodiments, among other things, this message may include cipher negotiation information, such as, a cipher string that describes the ciphers/cipher suites that the client agrees to use in this session.

At step 516, in at least one of the various embodiments, since the TMC is disposed between the client and server, it may be arranged to monitor the network traffic between the client and the server. Accordingly, in at least one of the various embodiments, the TMC may inspect the incoming HELLO message from the client and extract the cipher negotiation information (e.g., the TLS cipher string). In at least one of the various embodiments, the TMC may be arranged to map the cipher information provided by the client into negotiation data, such as, one or more bitfields and store it in a data store.

In at least one of the various embodiments, the TMC may generate the appropriate response message that includes a cipher/cipher suite selected based on the cipher string of the client. In at least one of the various embodiments, the TMC may store information regarding the selected cipher with the negotiation information. Next, the TMC may communicate the response message to the client.

At step 518, in at least one of the various embodiments, the client may obtain the TMC's (e.g., for TLS a server HELLO DONE) and continue establishing the secure communication session. Note, if the cipher negotiation failed the secure session will not be established.

At step 520, in at least one of the various embodiments, the client and server may communicate using the secure session. In at least one of the various embodiments, after settling on a mutually agreeable cipher/cipher suite there may be additional protocol steps (not shown) to fully establish and/or maintain the secure communication session.

Figure 6A:
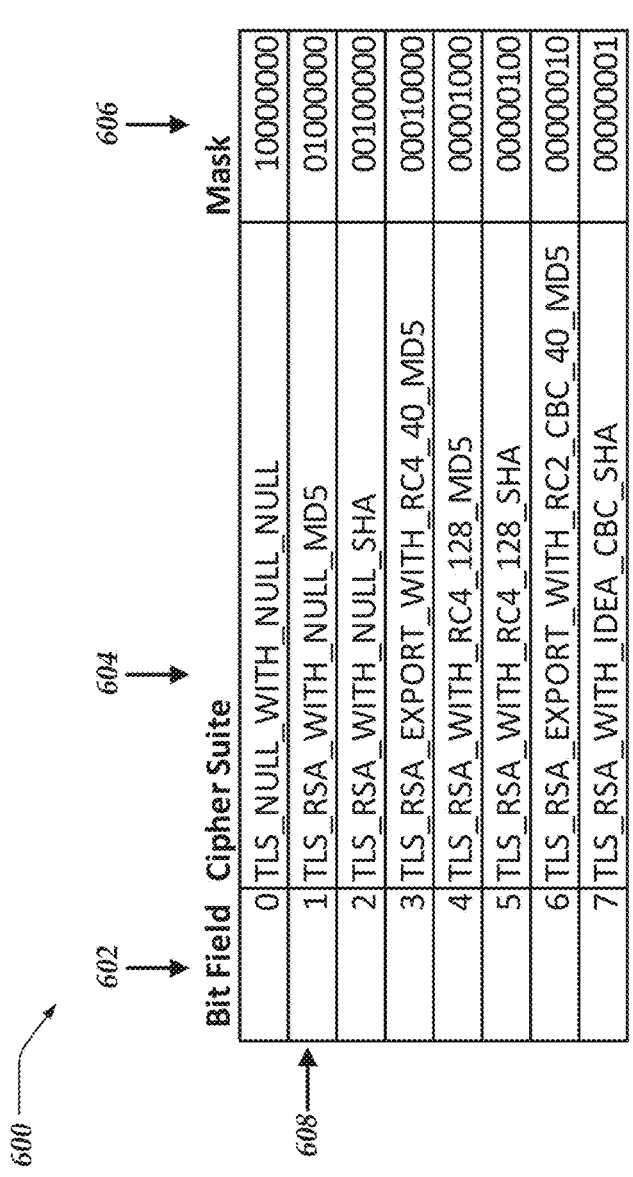
FIGS. 6A-6B illustrates a portion of data structures arranged to represent data for cipher rule feedback in accordance with at least one of the various embodiments.
Figure 6B:
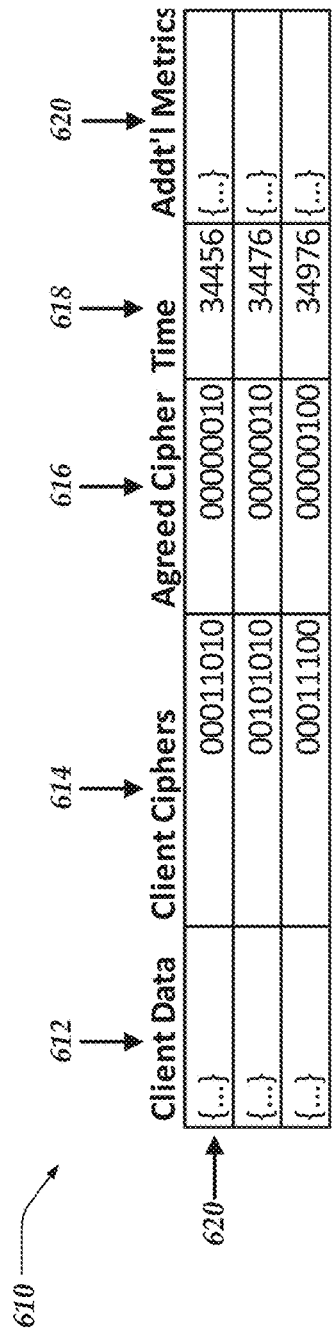

FIGS. 6A-6B illustrates a portion of data structures arranged to represent data for cipher rule feedback in accordance with at least one of the various embodiments.

FIG. 6A illustrates a portion of data structure table 600 for modeling or mapping cipher information using bitfields to represent the negotiation data in accordance with at least one of the various embodiments. In at least one of the various embodiments, table 600 may be arranged to have column 602 representing the bit fields for a cipher suite. Column 604 identifies the cipher suite, and column 606 shows a bit mask corresponding the cipher suite. In this example row 608 represents the definition of the bitfield information for a cipher suite. Row 608 defines bitfield one (1) as corresponding to cipher suite TLS_RSA_WITH_NULL_MD5, and its corresponding bit mask. In this example, the cipher suite names in table 500 are a well-known names of cipher suites as defined by Transport Layer Security (TLS) version 1.0. Accordingly, in this example, if a cipher string from a client or server is encountered, the contents may be mapped to a bit field based on table 500.

Also, in at least one of the various embodiments, even though this example shows cipher suites being mapped to bit fields in an 8-bit range, in practice one or more larger bit fields may be used, such as, 32-bit, 64-bit, 128-bit, or the like, to enable all relevant cipher suites to be represented.

FIG. 6B illustrates a portion of data structure table 610 for mapping cipher negotiation information to bitfields in accordance with at least one of the various embodiments. As described above, and in further detail below, a TMC may be arranged to track and store cipher negotiation information by monitoring the handshake messages used to establish secure communication session between clients and servers. In at least one of the various embodiments, table 600 is representative of a data structure that may be used to track and store cipher negotiation information. Accordingly, table 610 includes column 612 for storing client data, the client data column represents one or more columns for storing various information about the client, such as, user agent, HTTP cookie information, TCP fingerprints (made from hashing portion of the TCP information used in the communication, of the like), tuple information, SSL session IDs, or the like, that may be used to identify the client and/or the application used by the client. In some embodiments, client data column 612 may be omitted.

In at least one of the various embodiments, column 614 may be arranged to store a bitfield that represents the cipher string of the client that was provided during cipher negotiation. In this example, an 8-bit wide bitfield is used. Here, the ones (1s) in the field represent cipher suites that the client is ready and able to use in a secure communication session. Column 616 shows a bitfield representation of the cipher that was agreed upon by the server and client (if any). And, column 618 represents a timestamp or other time/sequence identifier.

In at least one of the various embodiments, column 620 may represent storage for one or more additional metrics to associate with the cipher negotiation. In some embodiments, column 620 may be implemented as more than one column. Or, in some embodiments, additional metrics and/or information may be stored in separate date structures (e.g., tables) that may be referenced from table 610. In at least one of the various embodiments, the additional metrics may include, client/server application names, application versions, server/client domain names, client/server operating systems, or the like. Also, in some embodiments, the additional metrics may include various properties of the ciphers that were requested and/or settled on, such as, cipher class (e.g., elliptic curve cryptography, Federal Information Processing Standard, or the like), cipher CPU load, whether the client/server employ hardware acceleration for the cipher, and so on.

Also, in some embodiments, additional metrics may include tracking the configuration rules that may be used by a TMC to determine requirements, priorities, and/or preferences for selecting ciphers and/or cipher suites. For example, in at least one of the various embodiments, a TMC, such as, TMC 408 may be configured to use rules such as, require FIPS, prefer perfect forward secrecy, or the like, or combination thereof.

In at least one of the various embodiments, taking row 620 as an example, the TMC has tracked and stored cipher negotiation information. Column 614 for row 620 includes the bitfield 00011010 that indicates that the client was willing to accept the following ciphers: TLS_RSA_EXPORT_WITH_RC4_40_MD5; TLS_RSA_WITH_RC4_128_MD5; and TLS_RSA_EXPORT_WITH_RC2_CBC_40_MD5. And, column 616 shows that for row 620, the server and client ultimately settled on the cipher at bitfield position 6, TLS_RSA_EXPORT_WITH_RC2_CBC_40_MD5 to use for the secure communication session.

In at least one of the various embodiments, if the client and server may be unable to agree to a mutually acceptable cipher, the agreed cipher may be a zero valued bit field or other value indicating a failed negotiation.

In at least one of the various embodiments, tables such as table 610 may include thousands, or millions of records rather than the few shown herein. Likewise, there may be additional columns than shown here, depending the information the being associated with the cipher negotiation information. Also, there may be additional indexes, lookup tables, hash tables, or the like, that may be implemented to optimize reading and/or writing performance of the data store that stores the tables.

In at least one of the various embodiments, other data structures may be employed to represent the negotiation data used in tables 600 and 610. Accordingly, one of ordinary skill in the art will appreciate the innovations described herein are not limited to using bitfields for representing negotiation data.

Figure 7A:
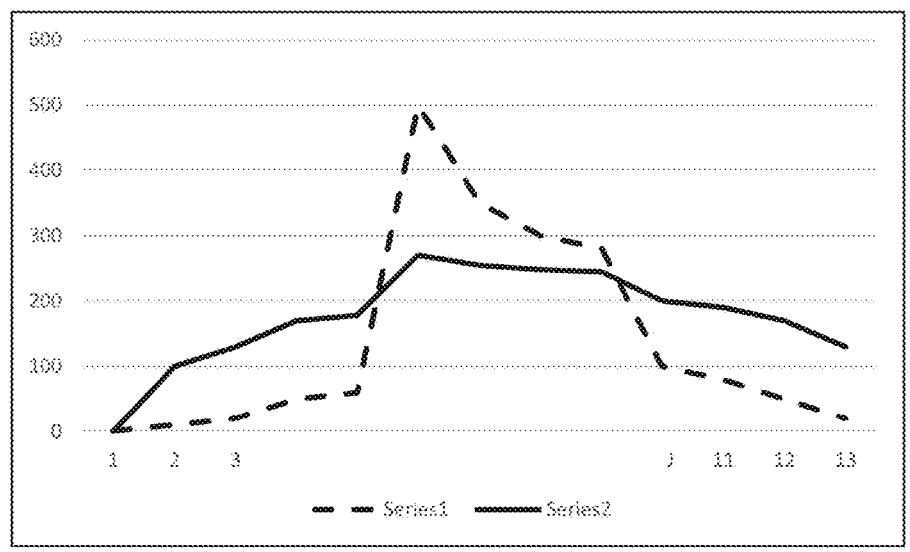
FIGS. 7A-7B represent visualizations and/or report information that may be generated from stored cipher negotiation information.
Figure 7B:
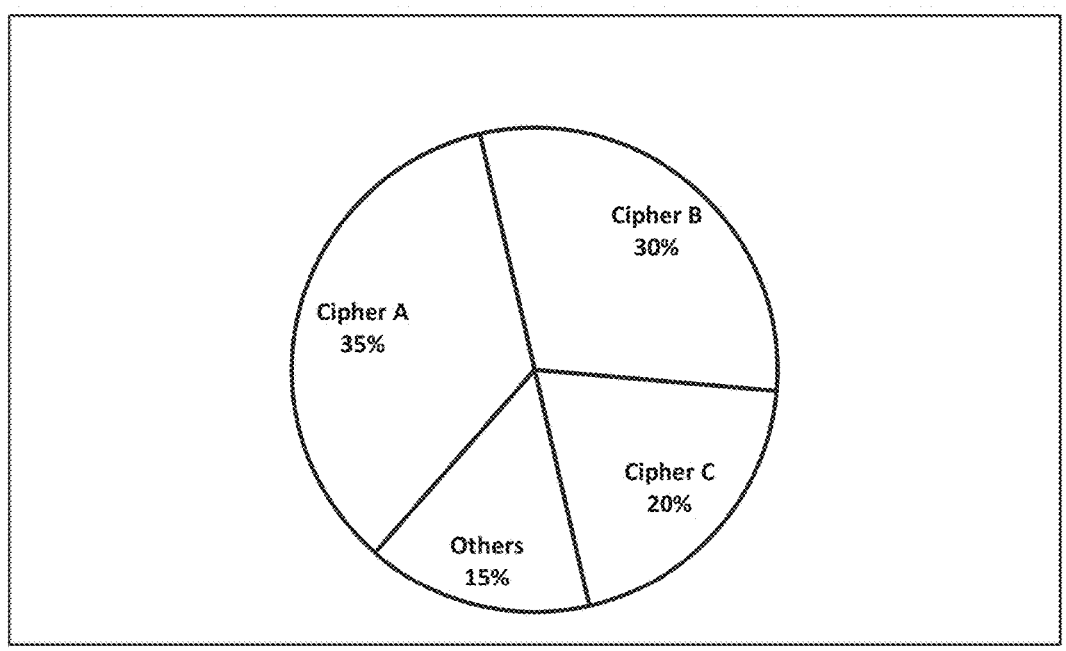

FIGS. 7A-7B represent visualizations and/or report information that may be generated from stored cipher negotiation information. As discussed above, the stored cipher negotiation information enables the TMC or other computers, to generate report information and/or visualizations that may illuminate the cipher negotiations that may be occurring in the network. As cipher negotiation information is collected various data mining techniques may be employed to generate report information may answer arbitrary "questions" about the ciphers being requested by clients and the ciphers being used for secure communications. Also, in at least one of the various embodiments, information regarding failed negotiations may be generated.

FIG. 7A shows example graph 702 for displaying cipher negotiation information in accordance with at least one of the various embodiments. Graph 702 may represent a time series distribution showing the number of times two different ciphers may be included in a client cipher string. In this example, axis 706 represents the time in hours (or days). Axis 708 represents the number of times a cipher may have been included in a client negotiation string. Also, in this example, curve 710 represents count values for a particular cipher and curve 712 represents count values for another cipher.

Likewise, FIG. 7B shows example pie chart 704 that shows a distribution of the types of ciphers requested by clients over a given time period. For example, chart 704 shows that Cipher A is included in 35% of client cipher strings; cipher B in 30% of client cipher strings, cipher C is included in 20% of client cipher strings, and, in this example, other cipher strings are included in 15% of client cipher strings. One of ordinary skill in the art will appreciate that tracking the cipher strings and cipher negotiation results provides data that may be used to provide a variety of reports and/or report type. For brevity and clarity just these two are shown here. However, the negotiation information may be used in other reports and/or report formats.

Generalized Operations

FIGS. 8-11 represents the generalized operations for cipher rule feedback in accordance with at least one of the various embodiments. In at least one of the various embodiments, processes 800, 900 1000, and 1100 as described in FIGS. 8-11 may be implemented by and/or executed on a single TMC and/or network computer, such as network computer 300 of FIG. 3. In other embodiments, these processes or portions thereof may be implemented by and/or executed on a plurality of network computers, such as network computer 300 of FIG. 3, client computer 200 of FIG. 2, or the like. However, embodiments are not so limited, and various combinations of network computers, client computers, virtual machines, TMCs, or the like, may be utilized. Further, in at least one of the various embodiments, the processes described in conjunction with FIGS. 8-11 may be operative in traffic management computers, systems, and/or architectures, such as, those described in conjunction with FIGS. 1-7.

Figure 8:
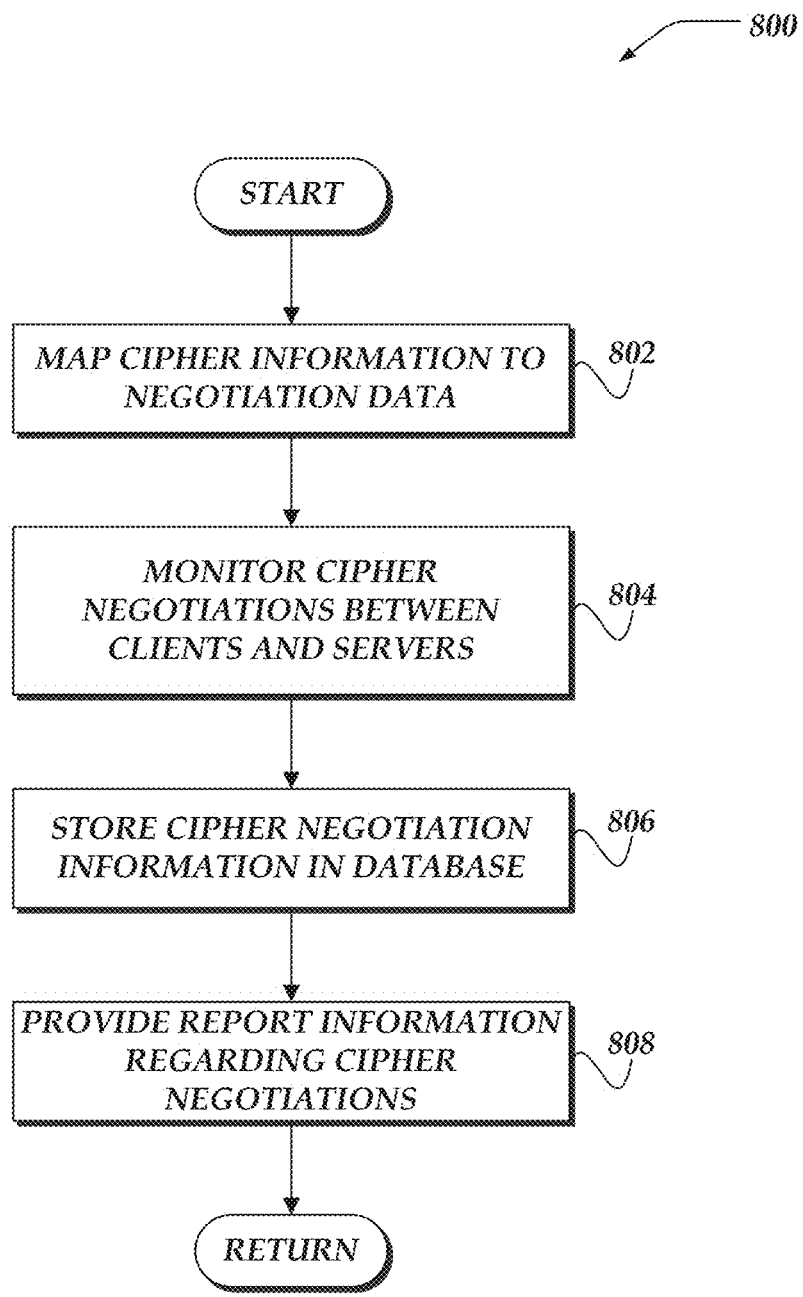
FIG. 8 illustrates an overview flowchart of a process for cipher rule feedback in accordance with at least one of the various embodiments.

FIG. 8 illustrates an overview flowchart of process 800 for cipher rule feedback in accordance with at least one of the various embodiments. After a start block, in at least one of the various embodiments, at block 802, cipher information for ciphers that may be expected to be used and/or requested may be mapped to negotiation data, such as, one or more bitfields. In at least one of the various embodiments, this may be a configuration time operation where mapping rules may be defined to map one or more security/cryptography features to bitfields. In some embodiments, cipher suites may be mapped to individual bits in one or more bitfields. In other embodiments, other features or components of the cipher suite may be separately mapped to bitfields. For example, in some embodiments, features such a cryptographic key size, cryptographic hash functions, encryption protocols, or the like, may be separately mapped to negotiation data, such as, bitfields to enable them to be tracked and reported on separately.

At block 804, in at least one of the various embodiments, one or more TMCs may be arranged to monitor cipher negotiations that may be conducted between clients and servers. In at least one of the various embodiments, the one or more TMCs may be disposed between the clients and servers such the network traffic between them may be monitored. In some embodiments, the TMC may be configured to perform deep packet inspection of some or more all the network traffic communication between clients and servers. Accordingly, the one or more TMCs may be configured to identify cipher negotiations that occur between the clients and servers it is monitoring. TMCs may extract copies of the cipher negotiation information from the monitored traffic.

At block 806, in at least one of the various embodiments, the cipher negotiation information may be stored in data store, such as, a database, memory buffer, or the like. In at least one of the various embodiments, some or all of the extracted cipher negotiation information may be mapped to negotiation data, such as, one or more of the bitfields discussed above and stored in a data store with additional data about clients—if any is available. As mentioned above, the stored cipher negotiation information may be indexed in various ways to optimize performance of the data store. For example, bitfields corresponding to client cipher negotiation strings (e.g., See, FIG. 6B, column 614 in table 610) may be used as key values in hash lookup table.

At block 808, in at least one of the various embodiments, report information about the cipher negotiations may be provided based on the cipher negotiation information stored in the data store. TMCs or other computers provided access to the data store of cipher negotiation information may be arranged to provide reports and/or visualizations based on the stored cipher information. Next, control may be returned to a calling process.

Figure 9:
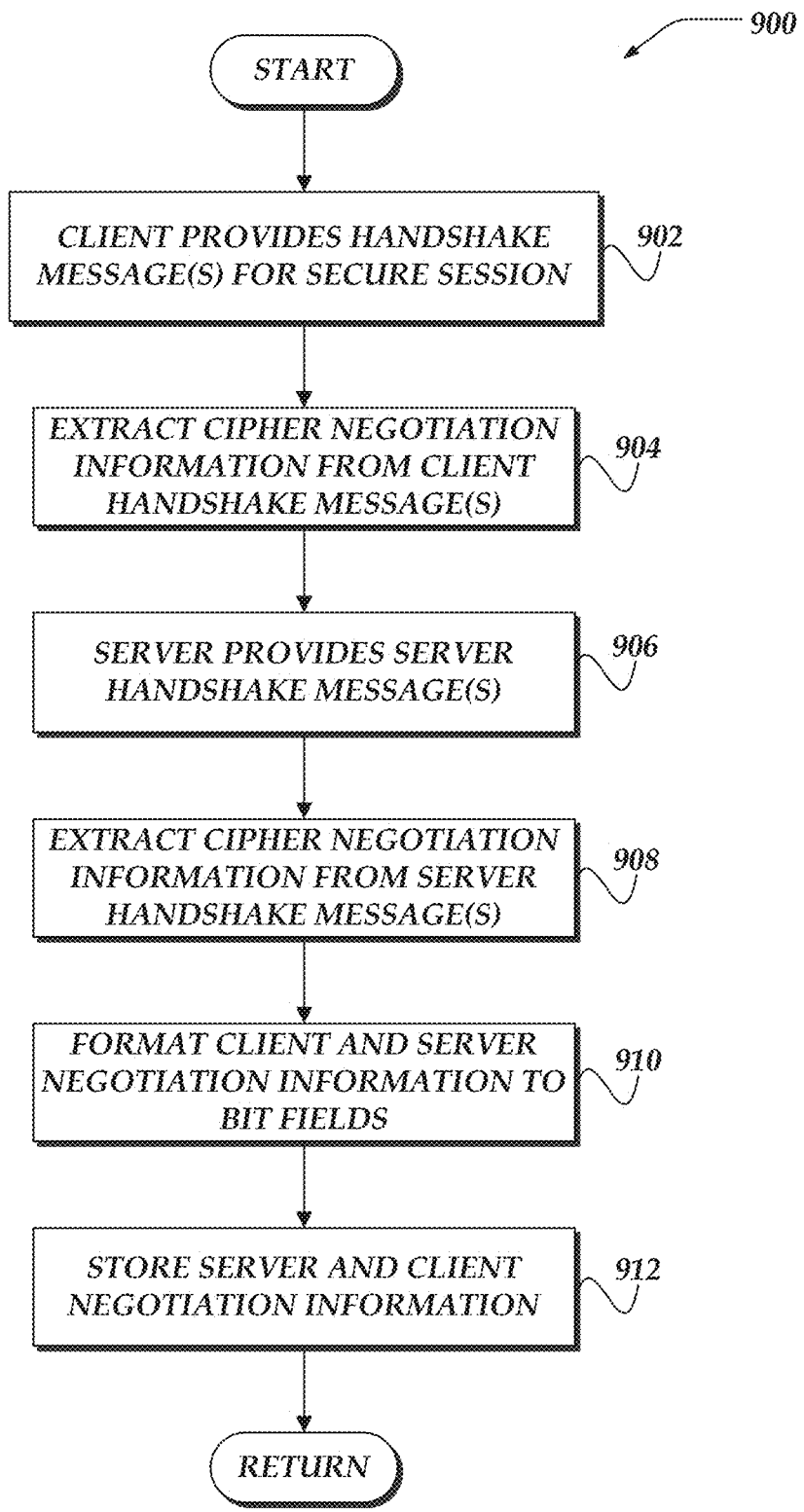
FIG. 9 illustrates an overview flowchart of a process for cipher rule feedback in accordance with at least one of the various embodiments.

FIG. 9 illustrates a flowchart of process 900 for cipher rule feedback in accordance with at least one of the various embodiments. At block 902, in at least one of the various embodiments, a client may provide one or more handshake messages for establishing a secure communication session. In at least one of the various embodiments, the TMC may monitor the network traffic provided by the client computer.

In at least one of the various embodiments, clients and servers may employ one or more well-known secure communication protocols to conduct secure communications. According, in at least one of the various embodiments, one or more pattern matching rules, or the like, may be defined that enable the TMC to identify handshake messages that may be associated with the establishment of a secure communication.

In at least one of the various embodiments, if the secure communication does not use a well-known protocol, the TMC may be arranged to employ customized pattern matching rules, or the like, that may be arranged to identify the handshake messages in the network traffic.

At block 904, in at least one of the various embodiments, the TMC may extract cipher negotiation information from the client handshake message. In at least one of the various embodiments, the secure communication protocol may define a particular method for performing cipher negotiation between clients and servers. Accordingly, the TMC may be arranged to leverage this information to extract a copy of the cipher negotiation information provided by the client. The cipher negotiation information may be associated with the client that has provided the handshake messages. In some embodiments, the TMC may be arranged to associate the cipher negotiation information found in the handshake message with a connection flow, session, or the like, that is associated with the client.

At block 906, in at least one of the various embodiments, the server may provide one or more server handshake message in response to the client handshake messages. In at least one of the various embodiments, the server handshake messages may be generated by the TMC itself if it is negotiating the cipher policy with the client rather the server. In one or more embodiments, the server may generate a response message that is consistent with the protocol being used. Accordingly, the response to the client's cipher negotiation information may be included in the handshake response message. The contents of the response message may be determined based on the protocol that is being used to establish the secure communication session. For example, if the client provided a list of cipher suites, the server may provide a cipher suite selected from the list of cipher suites that were included in the handshake message. Also, in some embodiments, depending on the protocol being used, there may be one or more intervening handshake message exchanges that occur before the server provides a response relevant to cipher negotiation.

At block 908, in at least one of the various embodiments, the cipher negotiation information from the one or more server handshake messages may be extracted by the TMC. In at least one of the various embodiments, the one or more TMCs that may be monitoring the communication of the handshake messages may identify the server's cipher negotiation information. In at least one of the various embodiments, this information may indicate the secure features, such as, as a cipher suite that the server agrees to use for secure communication. Similar to how the client's cipher negotiation information may be collected, the server's cipher negotiation information may be extracted from the network traffic that includes the server's handshake response message.

At block 910, in at least one of the various embodiments, the cipher negotiation information extracted from the client and server handshake messages may be transformed into negotiation data, such as, bitfield information. As described above, to facilitate efficient storage and efficient use of the cipher negotiation information, it may be converted to one or more bitfields. In at least one of the various embodiments, the TMC may be arranged to perform one or more mapping functions to map the client's and server's cipher negotiation information to one or more bitfields. In some embodiments, the particular negotiation data mappings may be defined using configuration information.

In at least one of the various embodiments, since the cryptographic features (e.g, ciphers, cipher suites, key sizes, or the like) may be represented using strings or other data types, the TMC may map the features to bits in a bitfields based on configuration information. In at least one of the various embodiments, one or more classes of features may be defined such that different cipher suites that have a same characteristic or feature may be mapped to the same bitfield. For example, for some bitfields, all RSA based ciphers may be mapped to the same bit field. Likewise, in some embodiments, for example, some or all of the currently known exploited ciphers may be mapped to the same bit field.

Also, in at least one of the various embodiments, multiple bitfields may be generated for storing the cipher negotiation information. For example, in at least one of the various embodiments, one bitfield may be arranged to represent the list of cipher suites proposed by a client. Also, for example, bitfields may be arranged to track one or more aspects of the cipher negotiation, such as, key sizes, protocol version (e.g., DES, RSA, or the like), encryption families, or the like.

Also, in at least one of the various embodiments, portions of the mapping operations may be performed earlier in the process. For example, mapping the client cipher negotiation information may occur as part of block 904.

At block 912, in at least one of the various embodiments, the server and client negotiation information may be stored in a data store. As described above, the mapped cipher negotiation information may be stored in one or more data stores. In at least one of the various embodiments, the more recent cipher negotiation information may be stored in in-memory caches, with the remainder stored on slower devices such as hard drives, SSDs or the like, or combination thereof. Next, control may be returned to a calling process. The amount of cipher negotiation information stored using in-memory caches may depend of the size of the cache memory that is allocated for storing cipher negotiation information. The size of the allocation of cache memory may be defined in configuration information used by the TMC.

Figure 10:
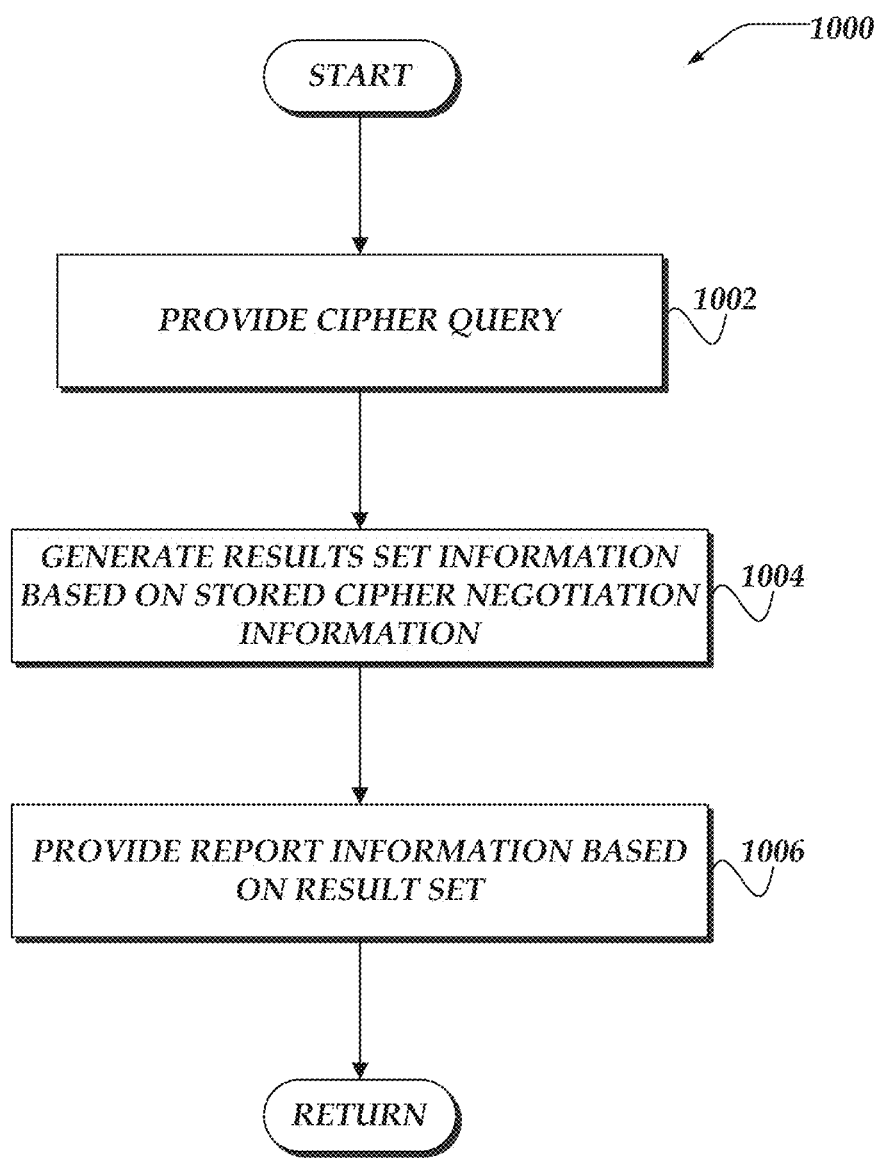
FIG. 10 illustrates an overview flowchart of a process for providing reporting information based on the stored cipher negotiation information in accordance with at least one of the various embodiments.

FIG. 10 illustrates an overview flowchart of process 1000 for providing reporting information based on the stored cipher negotiation information in accordance with at least one of the various embodiments. At block 1002, in at least one of the various embodiments, a cipher query may be provided. In at least one of the various embodiments, a cipher query may be an arbitrary query that the cipher negotiation information may be relevant for answering. Queries may be provided using a query language or data manipulation language, such as, structured query language (SQL), or the like. Also, in at least one of the various embodiments, queries may be provided based on inputs to a graphical user interface. Generally, as long as a database/ query processor has access to the stored cipher negotiation information it may be arranged to provide queries for sifting through the collected cipher negotiation data.

At block 1004, in at least one of the various embodiments, result information responsive to the provided query may be generated based on the stored cipher negotiation information. In at least one of the various embodiments, depending on the contents or expressions included in the query, zero or more records in the stored cipher negotiation information data store may be identified to be responsive to the query. The particular format of the result information may depend on the particular query and/or the type of data store. In some embodiments, the result information may be provided as JavaScript Object Notations (JSON) data, extensible markup language (XML) files, comma separated value (CSV) files, or the like, or combination thereof. For example, the result information may be a SQL result set if the data store supports SQL queries.

At block 1006, in at least one of the various embodiments, report information that is based on the result information may be generated and/or provided in response to the query. The result information may be used to generate report information such as graphs, charts, tables, lists, and so on. In some the embodiments, the report information may be provided to another computer/application for further processing. For example, the query may generate result information that includes rows of text data that may be provided to another application that may be used to generate visualizations based on the rows of text data. Next, control may be returned to the calling process.

In at least one of the various embodiments, reports information may include describing failures to negotiate a cipher for secure communication. Such reports may include information, such as, client user-agent, server application, source IP, destination IP, requested ciphers, allowed ciphers, time-of-day, number of requests, or the like, or combination thereof.

Figure 11:
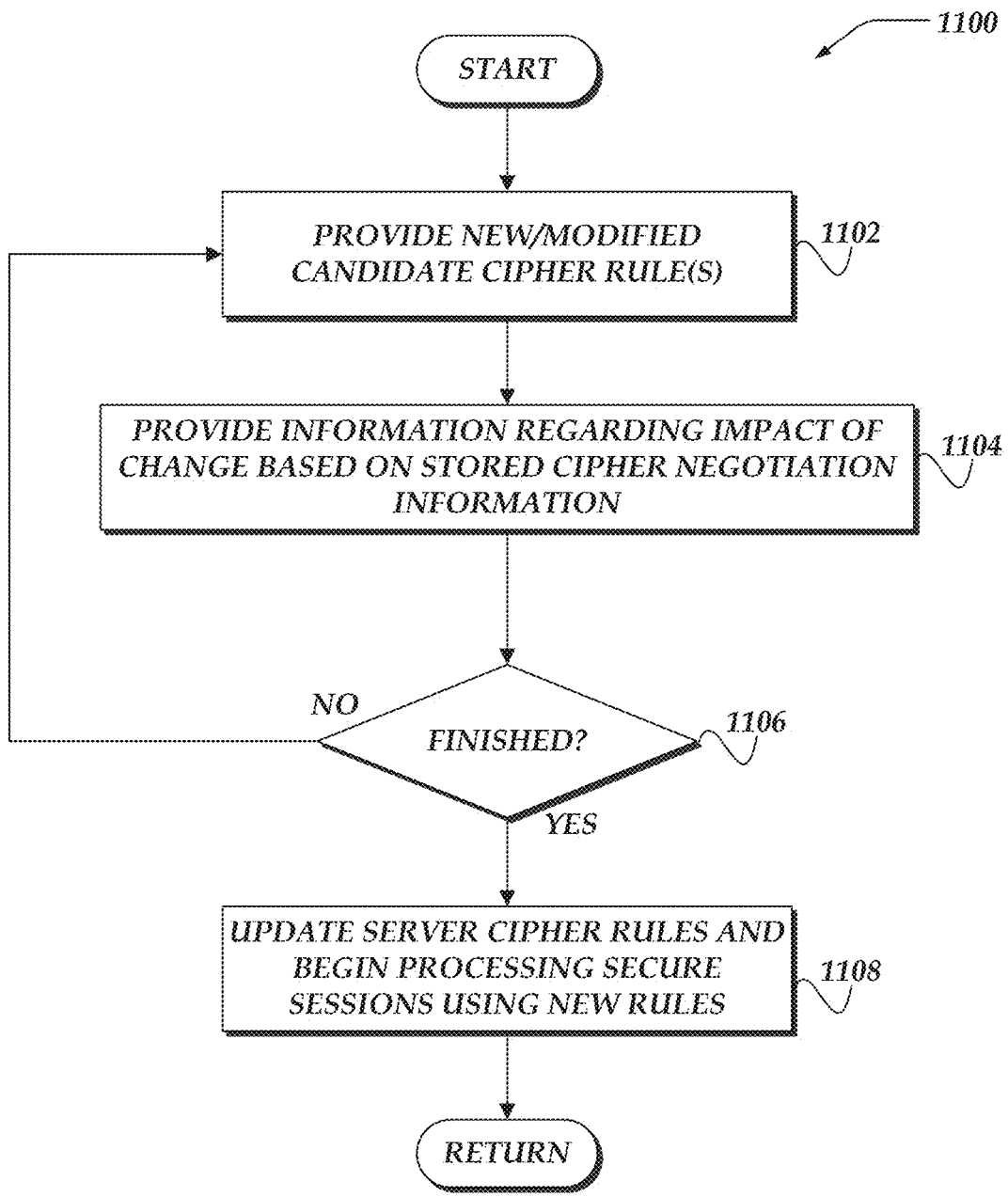
FIG. 11 illustrates an overview flowchart of a process for providing interactively testing cipher rules in accordance with at least one of the various embodiments.

FIG. 11 illustrates an overview flowchart of process 1100 for interactively testing cipher rules in accordance with at least one of the various embodiments. At block 1102, in at least one of the various embodiments, one or more new and/or modified candidate cipher rules may be provided. In at least one of the various embodiments, the TMC may be arranged to enable users to provide modified cipher rules that define the types of cryptographic features that may be allowed to use for secure communication to the servers that is monitoring. Likewise, in at least one of the various embodiments, servers and/or server applications may be arranged to enable users to define rules that define the types of cryptographic features that may be allowed for use in secure communications. Also, in at least one of the various embodiments, such rules may be employed for setting/defining preferences, such as, preferring one cipher suite over another, as well as, excluding one or more cipher suites from being used to secure communications.

At block 1104, in at least one of the various embodiments, information regarding the number of clients/sessions expected to be impacted by the candidate cipher rule may be provided based on the stored cipher negotiation information. In at least one of the various embodiments, the candidate cipher rules (from block 1102) may be mapped to be consistent with the negotiation data (e.g., bitfields) as described above. Accordingly, in at least one of the various embodiments, a query may be formed that includes the negotiation data, such as, a bitfield, that represents the candidate/proposed version of cipher rules.

In some embodiments, impacted clients may include clients that may be excluded by the change. Also, in at least one of the various embodiments, one or more additional metrics, such as, additional metrics 620 may be employed to analyze the potential impact of the proposed change.

Also, in at least one of the various embodiments, a query may at least be arranged and/or executed by a computer to determine records from the stored cipher negotiation information over a defined range of time that are compatible and/or incompatible with the candidate cipher rules. In some embodiments, a count of the change in compatible clients and/or the count of the change in incompatible clients may be generated by comparing the provided candidate cipher rules to the cipher negotiation information of the clients. For example, if the candidate cipher rules exclude one or more ciphers that were not previously excluded there may be a number of clients that would be unable to successfully negotiate a cipher suite.

In at least one of the various embodiments, the process may be arranged to generate a report or report information that reflects the impact of the proposed cipher rule modification. In some embodiments, impacts one or more additional metrics, such as, additional metrics 620, or the like, may be considered and/or analyzed and included in the report information.

In at least one of the various embodiments, the process may display a visualization of the impact the cipher rule change may have that is based on the previously collected cipher negotiation information. In at least one of the various embodiments, such visualization may include information, such as, user-agent, client/server application impacts, CPU load impact, or the like, if available. For example, in at least one of the various embodiments, a change to a cipher rule that excludes obsolete cryptography features may prevent some older client applications from establishing secure communications unless those older client applications also support other allowed cryptography features. Accordingly, for this example, a graph or chart may be displayed to visualize the number/percentage of clients that may be excluded by the proposed change.

At decision block 1106, in at least one of the various embodiments, if the interactive session is finished, control may flow to block 1108; otherwise, control may loop back to block 1102.

In at least one of the various embodiments, each time the candidate cipher rules are changed, feedback that shows how the proposed rule changes would have affected previous cipher negotiations may be presented. This feedback may include the number of clients that would have been excluded by the proposed rule changes. It some embodiments, the feedback may show the type of user-agents and/or client applications that may be excluded. Accordingly, if the changes only affect user-agents/applications that will no longer be supported, the feedback may indicate as such.

Also, in at least one of the various embodiments, the feedback information may show the impact the change may have on servers/server applications. For example, in some embodiments, clients may support "stronger" security options than the server application supports. Accordingly, in some cases, the proposed rule changes may disable one or more server applications from establishing secure communications. Thus, this type of feedback may notify user that the server application would need to be upgraded and/or re-configured to support the proposed cipher rule change. In at least one of the various embodiments, in the absence of this type of feedback, users may be unaware of the potential service disruptions that may be caused by a cipher rule change. Further, in at least one of the various embodiments, feedback information may include impacts (changes) to one or more additional metrics, such as, additional metrics 620.

At block 1108, in at least one of the various embodiments, the cipher rules may be updated so they may be used to process requests to establish secure communication sessions. In at least one of the various embodiments, if the user is satisfied with the feedback associated with a candidate cipher rule, it may be deployed as an active cipher rule rather than a candidate. Also, in at least one of the various embodiments, cipher negotiation information may be updated to include version information that correspond to changes in the cipher rules. The version information enables to enables queries/reports to distinguish between when changes are made to the configuration of cipher rules. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing network communication, executable by one or more traffic management computers with one or more processors executing the method, the method comprising actions to:
   receiving, by the one or more processors, network traffic that includes client cipher negotiation information from a client;
   receiving, by the one or more processors, other network traffic that includes server cipher negotiation information from a server;
   receiving, by the one or more processors, negotiation data that corresponds to the client cipher negotiation information and other negotiation data that corresponds to the server cipher negotiation information;
   mapping, by the one or more processors, one or more features of the negotiation data and the other negotiation data to one or more bitfields;
   storing, by the one or more processors, the one or more bitfields mapped to the negotiation data and the other negotiation data in a data store of the one or more traffic management computers, wherein the storing of the one or more bitfields instead of the negotiation data and other negotiation data improves storage efficiency and efficient use of the client cipher negotiation information and the server cipher negotiation information;
   sending, by the one or more processors, the server cipher negotiation information to the client; and
   when a query is received from a query client, perform, by one or more processors, further operations, including:
      providing, by the one or more processors, result set information based on the stored the negotiation data and the other negotiation data in a data store of the one or more traffic management computers; and
      sending, by the one or more processors, reporting information that is based on the result set information to the query client; and
   receiving, by the one or more processors, one or more candidate cipher rule modifications; and
   including in the report information, by the one or more processors, a list of clients and servers to be prevented from negotiating secure connections based on the one or more candidate cipher rule modifications, the stored negotiation data, or the stored other negotiation data.

2. The method set forth in claim 1, wherein the one or more processors are on the same traffic management computer.

3. The method set forth in claim 1, wherein the negotiation data and the other negotiation data are arranged as separate bitfields, wherein each bit in the separate bitfields corresponds to a portion of the client cipher negotiation information and the server cipher negotiation information.

4. The method set forth in claim 1, further comprising, performing by one or more processors on the one or more traffic management computers, further operations, including:
   storing information about one or more clients that attempted to negotiate a secure session with one or more servers; and
   including in the reporting information the information about the one or more clients, wherein the information about the one or more clients includes one or more of the client operating system, the client user-agent, or client application.

5. The method set forth in claim 1, further comprising, performing by one or more processors on the one or more traffic management computers, further operations, including:
   storing information about one or more clients that successfully negotiated a secure session with one or more servers; and
   including in the reporting information the information about the one or more clients, wherein the information about the one or more clients includes one or more of the client operating system, the client user-agent, or client application.

6. The method set forth in claim 1, further comprising, performing by one or more processors on the one or more traffic management computers, further operations, including:
   receiving one or more candidate cipher rule modifications; and
   including in the report information a distribution of predicted changes in cipher negotiation outcomes based on the one or more candidate cipher rule modifications, the stored negotiation data, and the stored other negotiation data.

7. The method set forth in claim 1, further comprising, performing by one or more processors on the one or more traffic management computers, further operations, including:
   receiving one or more candidate cipher rule modifications; and
   including in the report information a performance impact of the one or more candidate cipher rule modifications based on the stored negotiation data and the stored other negotiation data, wherein the stored other negotiation data includes computing load information that is associated with the one or more candidate cipher rule modifications.

8. The method set forth in claim 1, further comprising, performing by one or more processors on the one or more traffic management computers, further operations, including:
   receiving one or more candidate cipher rule modifications; and
   including in the report information a distribution of cipher rule classes used for negotiation outcomes based on the one or more candidate cipher rule modifications, the stored negotiation data, or the stored other negotiation data.

9. The method set forth in claim 1, further comprising, performing by one or more processors on the one or more traffic management computers, further operations, including:
   receiving one or more candidate cipher rule modifications; and
   including in the report information a distribution of changes in cipher rule classes based on the one or more candidate cipher rule modifications, the stored negotiation data, or the stored other negotiation data.

10. One or more traffic management computers comprising:
    memory comprising programmed instructions stored in the memory; and
    one or more processors configured to be capable of executing the programmed instructions stored in the memory to:

receiving network traffic that includes client cipher negotiation information from a client;

receiving other network traffic that includes server cipher negotiation information from a server;

receiving negotiation data that corresponds to the client cipher negotiation information and other negotiation data that corresponds to the server cipher negotiation information;

mapping one or more features of the negotiation data and the other negotiation data to one or more bitfields;

storing the one or more bitfields mapped to the negotiation data and the other negotiation data in a data store of the one or more traffic management computers, wherein the storing of the one or more bitfields instead of the negotiation data and other negotiation data improves storage efficiency and efficient use of the client cipher negotiation information and the server cipher negotiation information;

sending the server cipher negotiation information to the client; and when a query is received from a query client, perform, by one or more processors on the one or more traffic management computers, further operations, including:

providing, by the one or more processors on the one or more traffic management computers, result set information based on the stored the negotiation data and the other negotiation data in a data store of the one or more traffic management devices; and sending, by the one or more processors on the one or more traffic management devices, reporting information that is based on the result set information to the query client; and receiving one or more candidate cipher rule modifications; and including in the report information, a list of clients and servers to be prevented from negotiating secure connections based on the one or more candidate cipher rule modifications, the stored negotiation data, and the stored other negotiation data.

11. The one or more traffic management computers set forth in claim 10, wherein one or more of the one or more processors are on the same traffic management computer.

12. The one or more traffic management computers set forth in claim 10, wherein the negotiation data and the other negotiation data are arranged as separate bitfields, wherein each bit in the separate bitfields corresponds to a portion of the client cipher negotiation information and the server cipher negotiation information.

13. The one or more traffic management computers set forth in claim 10, further comprising, performing by one or more processors on the one or more traffic management computers, further operations, including:

storing information about one or more clients that attempted to negotiate a secure session with one or more servers; and including in the reporting information the information about the one or more clients, wherein the information about the one or more clients includes one or more of the client operating system, the client user-agent, or client application.

14. The one or more traffic management computers set forth in claim 10, further comprising, performing by one or more processors on the one or more traffic management computers, further operations, including:

storing information about one or more clients that successfully negotiated a secure session with one or more servers; and including in the reporting information the information about the one or more clients, wherein the information about the one or more clients includes one or more of the client operating system, the client user-agent, or client application.

15. The one or more traffic management computers set forth in claim 10, further comprising, performing by one or more processors on the one or more traffic management computers, further operations, including:

receiving one or more candidate cipher rule modifications; and including in the report information a distribution of changes in cipher negotiation outcomes based on the one or more candidate cipher rule modifications, the stored negotiation data, or the stored other negotiation data.

16. The one or more traffic management computers set forth in claim 10, further comprising, performing by one or more processors on the one or more traffic management computers, further operations, including:

receiving one or more candidate cipher rule modifications; and including in the report information a performance impact of the one or more candidate cipher rule modifications based on the stored negotiation data, and the stored other negotiation data, wherein the stored other negotiation data includes computing load information that is associated with the one or more candidate cipher rule modifications.

17. The one or more traffic management computers set forth in claim 10, further comprising, performing by one or more processors on the one or more traffic management computers, further operations, including:

receiving one or more candidate cipher rule modifications; and including in the report information a distribution of cipher rule classes used for negotiation outcomes based on the one or more candidate cipher rule modifications, the stored negotiation data, or the stored other negotiation data.

18. The one or more traffic management computers set forth in claim 10, further comprising, performing by one or more processors on the one or more traffic management computers, further operations, including:

receiving one or more candidate cipher rule modifications; and including in the report information a distribution of changes in cipher rule classes based on the one or more candidate cipher rule modifications, the stored negotiation data, and the stored other negotiation data.

19. A processor readable non-transitory storage media that includes instructions for managing network communications, wherein execution of the instructions by one or more processors perform actions comprising:

receiving, by the one or more processors, network traffic that includes client cipher negotiation information from a client;

receiving, by the one or more processors, other network traffic that includes server cipher negotiation information from a server;

receiving, by the one or more processors, negotiation data that corresponds to the client cipher negotiation information and other negotiation data that corresponds to the server cipher negotiation information;

mapping, by the one or more processors, one or more features of the negotiation data and the other negotiation data to one or more bitfields;

storing, by the one or more processors, the one or more bitfields mapped to the negotiation data and the other negotiation data in a data store of the one or more traffic management computers, wherein the storing of the one or more bitfields instead of the negotiation data and other negotiation data improves storage efficiency and efficient use of the client cipher negotiation information and the server cipher negotiation information;

sending, by the one or more processors, the server cipher negotiation information to the client; and when a query is received from a query client, perform, by the one or more processors, further operations, including:

providing, by the one or more processors, result set information based on the stored the negotiation data and the other negotiation data in a data store of the one or more traffic management computers; and sending, by the one or more processors, reporting information that is based on the result set information to the query client; and receiving one or more candidate cipher rule modifications; and including in the report information, a list of clients and servers to be prevented from negotiating secure connections based on the one or more candidate cipher rule modifications, the stored negotiation data, and the stored other negotiation data.

20. The media set forth in claim 19, wherein the one or more processors are on a same traffic management computer.

21. The media set forth in claim 19, wherein the negotiation data and the other negotiation data are arranged as separate bitfields, wherein each bit in the separate bitfields corresponds to a portion of the client cipher negotiation information and the server cipher negotiation information.

22. The media set forth in claim 19, further comprising, performing by the one or more processors, further operations, including:

storing information about one or more clients that attempted to negotiate a secure session with one or more servers; and including in the reporting information the information about the one or more clients, wherein the information about the one or more clients includes one or more of the client operating system, the client user-agent, or client application.

23. The media set forth in claim 19, further comprising, performing by the one or more processors, further operations, including:

storing information about one or more clients that successfully negotiated a secure session with one or more servers; and including in the reporting information the information about the one or more clients, wherein the information about the one or more clients includes one or more of the client operating system, the client user-agent, or client application.

24. The media set forth in claim 19, further comprising, performing by the one or more processors, further operations, including:

receiving one or more candidate cipher rule modifications; and including in the report information a distribution of changes in cipher negotiation outcomes based on the one or more candidate cipher rule modifications, the stored negotiation data, and the stored other negotiation data.

25. The media set forth in claim 19, further comprising, performing by the one or more processors, further operations, including:

receiving one or more candidate cipher rule modifications; and including in the report information a performance impact of the one or more candidate cipher rule modifications based on the stored negotiation data, and the stored other negotiation data, wherein the stored other negotiation data includes computing load information that is associated with the one or more candidate cipher rule modifications.

26. The media set forth in claim 19, further comprising, performing by the one or more processors, further operations, including:

receiving one or more candidate cipher rule modifications; and including in the report information a distribution of cipher rule classes used for negotiation outcomes based on the one or more candidate cipher rule modifications, the stored negotiation data, or the stored other negotiation data.

27. The media set forth in claim 19, further comprising, performing by the one or more processors, further operations, including:

receiving one or more candidate cipher rule modifications; and including in the report information a distribution of changes in cipher rule classes based on the one or more candidate cipher rule modifications, the stored negotiation data, and the stored other negotiation data.

* * * * *